(12) United States Patent
Kotlinski

(10) Patent No.: US 8,266,788 B2
(45) Date of Patent: Sep. 18, 2012

(54) SYSTEM FOR JOINING TUBULAR MEMBERS

(76) Inventor: Krzysztof Kotlinski, Shelton, CT (US)

( * ) Notice: Subject to any disclaimer, the term of this patent is extended or adjusted under 35 U.S.C. 154(b) by 391 days.

(21) Appl. No.: 12/769,780

(22) Filed: Apr. 29, 2010

(65) Prior Publication Data

US 2011/0265303 A1     Nov. 3, 2011

(51) Int. Cl.
*B23P 19/00* (2006.01)
(52) U.S. Cl. ............... 29/754; 29/435; 29/748; 29/505; 29/510
(58) Field of Classification Search .............. 29/435, 29/428, 462, 505, 510, 517, 340, 34 D, 33 F, 29/748, 754; 72/59, 457, 458; 493/269, 493/299; 140/92.1, 92.2, 102, 118, 119, 140/93 R, 93.2, 93.4
See application file for complete search history.

(56) References Cited

U.S. PATENT DOCUMENTS

| | | | | |
|---|---|---|---|---|
| 5,937,916 | A * | 8/1999 | Hoyaukin | 140/57 |
| 6,672,609 | B2 * | 1/2004 | Pierman et al. | 280/504 |
| 6,860,893 | B2 * | 3/2005 | Wallace et al. | 606/200 |
| 2002/0019647 | A1 * | 2/2002 | Wallace et al. | 606/200 |

OTHER PUBLICATIONS

Daniel K. Debski, Composite Joints of Aerostructures, Transactions of the Institute of Aviation, 2002, Issue 170-171, pp. 3-27, Poland.

* cited by examiner

*Primary Examiner* — Derris Banks
*Assistant Examiner* — Tai Nguyen
(74) *Attorney, Agent, or Firm* — Michael A. Blake

(57) ABSTRACT

A system for joining tubular members comprising: a U-shaped joining member, with a first leg, a bottom of the U in communication with the first leg, and a second leg in communication with the bottom of the U, and wherein the first leg and second legs have a taper such that the cross-sectional surface area of the first leg is at a minimum at generally the far end of the first and second legs, and the cross-sectional surface is at a maximum at generally the beginning end of the first and second legs; an anchor member configured to fit generally in the bottom of the U; a first tubular member configured to fit abutting the anchor member, and between the first and second legs; a wire made of anisotropic material configured to be wound about the first leg, second leg, and a portion of the first tubular member located between the first leg and second leg; a second tubular member configured to structurally attach to the first tubular member, U-shaped joining member, anchor member, and anisotropic material; a plurality of windings configured to attach the second tubular member to an anchored member. A method of making two joining members. A method of joining tubular members.

4 Claims, 8 Drawing Sheets

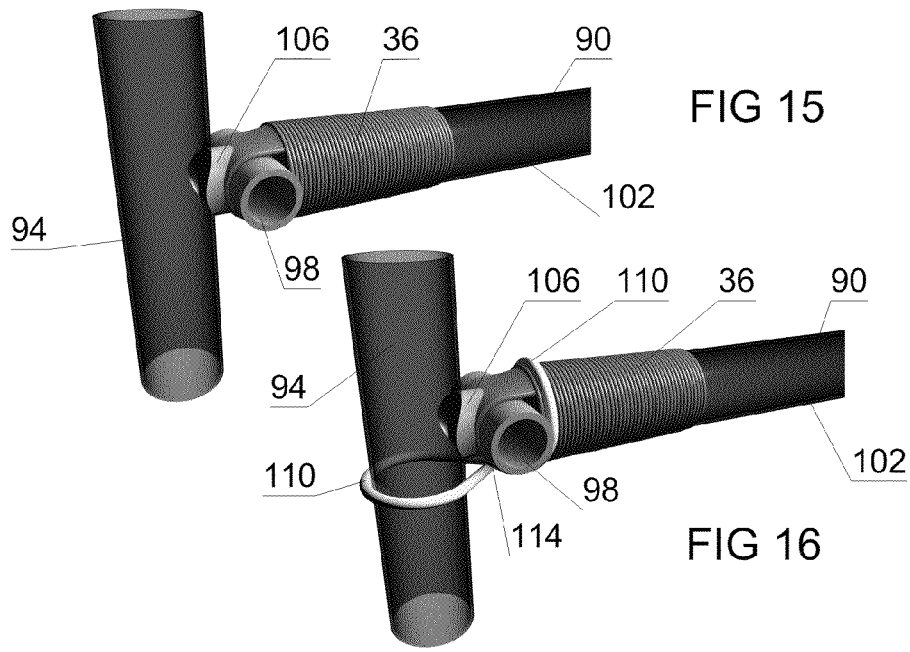
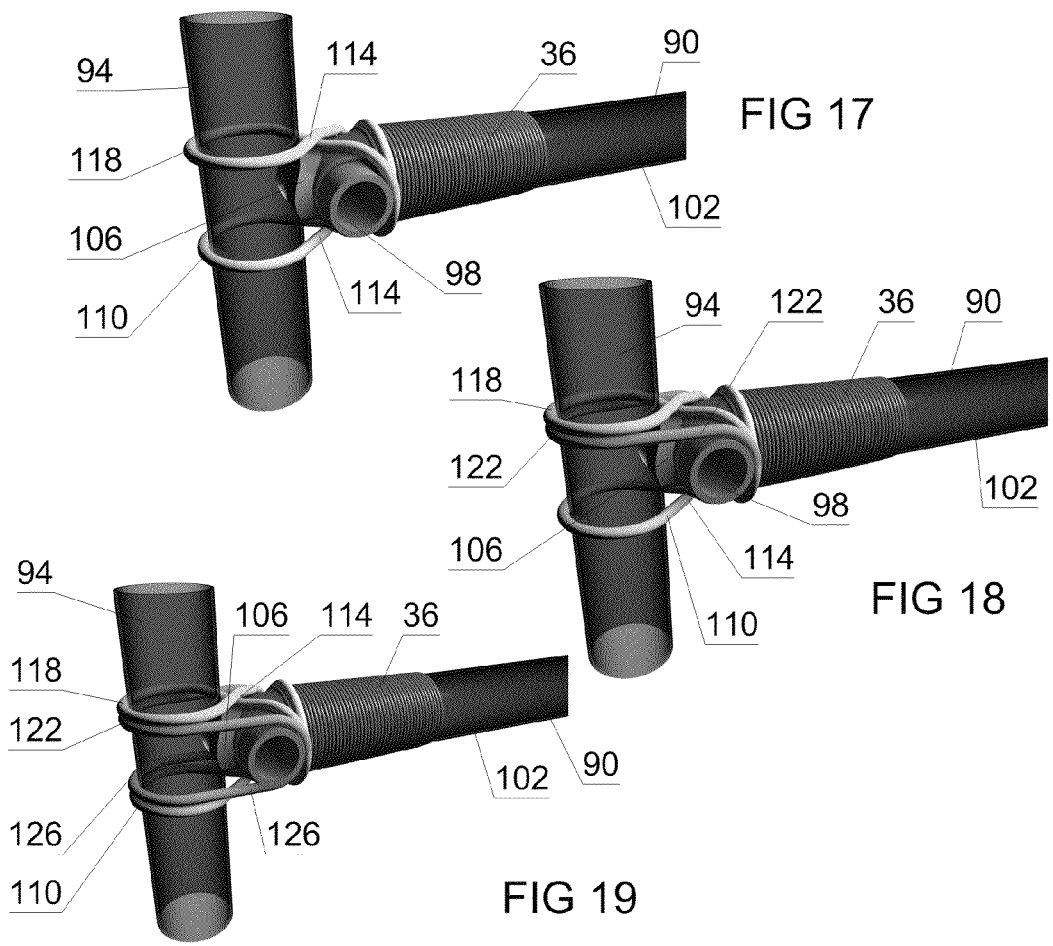

SYSTEM FOR JOINING TUBULAR MEMBERS

TECHNICAL FIELD

The present invention relates to a method and system of joining tubular members.

BACKGROUND

Joining tubular members can be one of the most difficult problems that a designer faces. Common ways of joining tubular members is by welding, riveting, and jointing with bolts and pins. For welding, a complicated and laborious process, high-skilled workers are required. The welding process often causes large internal stresses in the tubular members that can affect the useful life of the tubular member. Welding makes already high production cost, higher. Some tubular members are made out of non-weldable material, such as aluminum or titanium alloys. Also, some tubular members are made out of a composite material. Composite materials (or composites for short) are engineered materials made from two or more constituent materials with significantly different physical or chemical properties which remain separate and distinct on a macroscopic level within the finished structure. Composite tubes, where the composite material has carbon or glass fibers, are becoming more and more used. A big strength for stress and tension alongside an axis of a composite tube is achieved by directing majority of filaments alongside the tube's axis. This creates an anisotropy of the tube. Such tubes typically cannot be welded, or riveted together, without losing the effectiveness of the tubular member, whether it is made from a non-weldable material such as aluminum or titanium, or a composite material.

Thus there is a need for a method and system of joining together tubular members that overcomes the above listed and other disadvantages.

SUMMARY OF THE INVENTION

The disclosed invention relates to a system for joining tubular members comprising: a U-shaped joining member, with a first leg, a bottom of the U in communication with the first leg, and a second leg in communication with the bottom of the U, and wherein the first leg and second legs have a taper such that the cross-sectional surface area of the first leg is at a minimum at generally the far end of the first and second legs, and the cross-sectional surface is at a maximum at generally the beginning end of the first and second legs; an anchor member configured to fit generally in the bottom of the U; a first tubular member configured to fit abutting the anchor member, and between the first and second legs; a wire made of anisotropic material configured to be wound about the first leg, second leg, and a portion of the first tubular member located between the first leg and second leg; a second tubular member configured to structurally attach to the first tubular member, U-shaped joining member, anchor member, and anisotropic material; a plurality of windings configured to attach the second tubular member to an anchored member.

The disclosed invention also relates to a method of making two joining members, the method comprising: obtaining a first mandrel of length L; cutting a groove about the circumference of the first mandrel, generally at the middle of the mandrel; attaching a second mandrel in a generally perpendicular orientation to the first end of the first mandrel; attaching a third mandrel in a generally perpendicular orientation to the second end of the first mandrel, and in generally a parallel orientation to the second mandrel; attaching first and second pins to the second mandrel, with a distance W between the pins; attaching third and fourth pins to the third mandrel with a distance W between the pins; winding a wire about the first, second, and third mandrels, between the first and second pins and between the third and fourth pins; wrapping a tape transversely to the wire and around the first mandrel; cutting a taper is cut in wound wire such that the thickness of anisotropic material is at a minimum near the groove, and is at a maximum near the second mandrel and third mandrel, and such that two u-shaped joining members are formed; removing the two u-shaped joining members from the first, second, and third mandrels.

In addition, the invention relates to a method of joining tubular members, the method comprising: inserting a generally cylindrical anchor member into a U-shaped joining member, such that anchor member is located generally in the bottom of the U of the U-shaped joining member; inserting a first generally cylindrical composite member into the U-shaped joining member, such that the first generally cylindrical composite member is abutting the anchor member and is between the first and second legs of the U-shaped joining member; winding an anisotropic material about the joining member, first and second legs, and the first generally cylindrical composite member, thus forming an anchored composite member; positioning a second composite member abuttingly to the anchored composite member; inserting a filler material between and abutting the anchored composite member and the second composite member; attaching a first winding to the anisotropic material around the first composite member and the second composite member; attaching a second winding to the anisotropic material around the first composite member and the second composite member; attaching a third winding to the anisotropic material around the first composite member and the second composite member; attaching a fourth winding to the anisotropic material around the first composite member and the second composite member.

BRIEF DESCRIPTION OF THE DRAWINGS

The present disclosure will be better understood by those skilled in the pertinent art by referencing the accompanying drawings, where like elements are numbered alike in the figures, in which:

FIG. 15 is a perspective view an anchored composite member adjacent to a second composite member;

FIG. 16 is the device from FIG. 15 with a first winding;

FIG. 17 is the device from FIG. 16 with a second winding;

FIG. 18 is the device from FIG. 17 with a third winding;

FIG. 19 is the device from FIG. 18 with a fourth winding;

DETAILED DESCRIPTION

Figure 1:
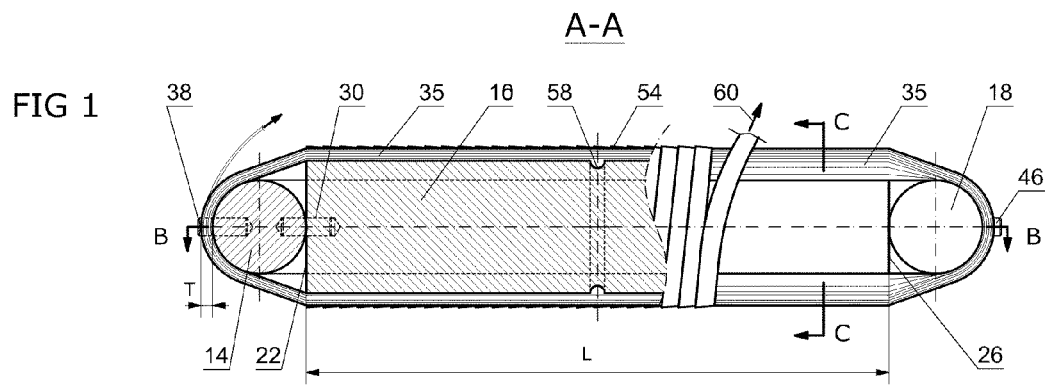
FIG. 1 is a cross-sectional view showing how the joining members are made.

The method of making a system for joining tubular members comprises taking a first mandrel 10 of length L and attaching a second mandrel 14 the first end 22 of the first mandrel 10, and attaching a third mandrel 18 to the second end 26 of the first mandrel 10. The first mandrel 10 has an undercut 58 or groove located generally in the middle of the length L of the first mandrel 10. The second mandrel 14 and third mandrel 18 are generally perpendicular to the first mandrel 10, and are generally parallel to each other. Each of the mandrels 10, 14, 18 is made of a material that will not adhere to a composite matrix. Such materials include but are not limited to: any solid material "non-stick" plastic polymer, such as polyethylene, or any "sticky" metal, such as steel, aluminum, titanium with the use of a release agent. A release agent is a specially formulated material placed between the mold and uncured resin/fiber (usually sprayed or painted on the mold surface) to prevent permanent bonding between the two during cure and facilitates demolding after cure. The second and third mandrels 14, 18 may be attached to the first mandrel 10 by any suitable means, including but not limited to using a first set of pins 30. Please note that the first set of pins 30 are only shown near the first end 22, but are also located near the second end 26, in order to connect the third mandrel 18 to the first mandrel 10, but are not shown for simplicity. The outer surface of the second and third mandrels 14, 18 generally correspond to the shapes of the structural elements that the tubular member is member is meant to join with. A wire 35 made of anisotropic material 34 is wound about the first, second and third mandrels 10, 14, 18. The anisotropic material 34 may be a unidirectional composite that is wound about the mandrels with generally a constant tension. The wire 35 may be any suitable elongated structure including cable and line. Such anisotropic material may include, but is not limited to: any type of unidirectional fiber like: carbon fiber, Kevlar, and glass fiber, etc., plus matrix. Examples of a matrix include: thermosetting and thermoplastic polymers, metals, and ceramic compounds. Please note that in this disclosure "Unidirectional" means the Orientation of fibers in one direction. Also, a matrix means a material in which reinforcing fiber of a composite is embedded. Tension, means applying constant and controlled strain keeping the fiber generally straight, for generally maximum strength, which will be established by the specific situation. The number of windings of the anisotropic material 34 will determine the amount of load that can be carried by the finished joint.

Figure 2:
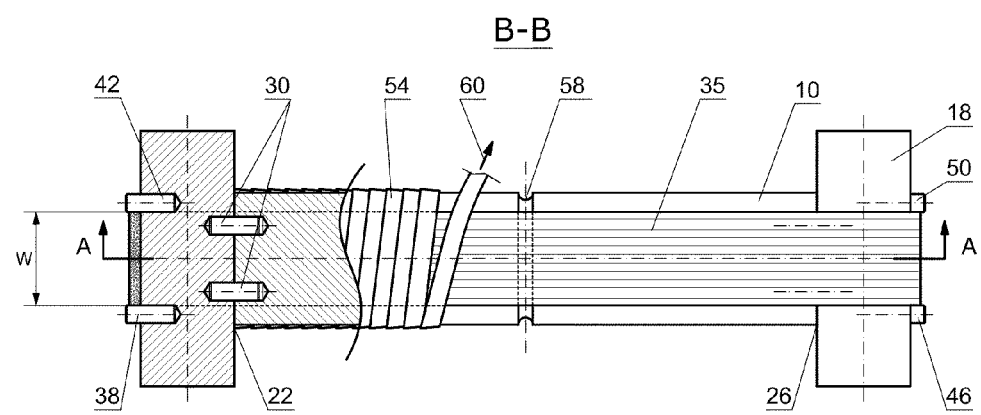
FIG. 2 is a top partially cross-sectional view of the device from FIG. 1.

Referring now to FIG. 2, the width W of the anisotropic material 34 may be determined by a first and second width pins 38, 42 located on the second mandrel 14, and third and fourth width pins 46, 50 located on the third mandrel 18. During the winding process, the wire 35 made of the anisotropic material 34 will be retained by the width pins 38, 42, 46, 50 for a pre-determined width W. Of course, other means may be used to set the width W of the anisotropic material 34, such as but not limited to locating knobs or extending members on the second and third mandrels 14, 18. Once finished with winding the anisotropic material 34 about the mandrels 10, 14, 18, the wound anisotropic material 34 may be wrapped with a tape 54. The winding process is complete when parameter "T" (see FIG. 7) is achieved. Parameter "T" depends on maximum load of tubular member. In practice, one can recalculate these parameters "W" and "T" by the number of windings, because the uni-directional composite which one uses has a definite value (sq. in or sq.mm). The tape 54 may be a plastic tape. The tape 54 is used to assure tight adherence of the anisotropic material 34 to the surface of the first mandrel 10.

Figure 3:
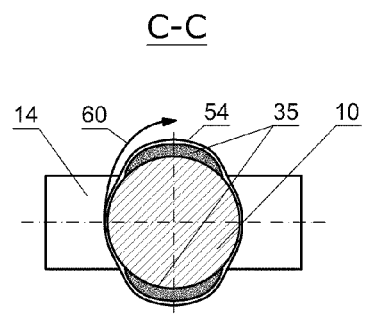
FIG. 3 is a front cross-sectional view of the device from FIG. 1.

FIG. 3 shows a cross-section through the first mandrel 10, with the anisotropic material 34 already wound onto the mandrels 10, 14, 18. The arrow 60 indicates a direction that the tape 54 may be wound over the anisotropic material 34. One then allows the tape 54 and anisotropic material 34 to "cure" and/or harden onto the first mandrel. In this disclosure cure shale mean an irreversible alteration of the molecular structure and physical properties of a thermosetting resin by chemical reaction, typically stimulated by heat and/or the presence of catalysts, with or without applied pressure. A hardener shall mean a substance that may be added to a resin to promote and/or control the curing process by participating in and being consumed by the cure reaction. Now, the tape 54 and anisotropic material is cut at a taper (see FIG. 4), where the anisotropic material remains thicker near the first and second ends 22, 26 of the mandrel 10, and becomes thinner near or at the undercut 58. Also, the tape 54 is removed. The tape may be removed by cutting or by unwrapping the tape. As a result of the cutting of the anisotropic material 34, and then removing the mandrels 10, 14, 18, two identical joining members 64 with a "U" shape are made, see FIG. 4.

Figure 4:
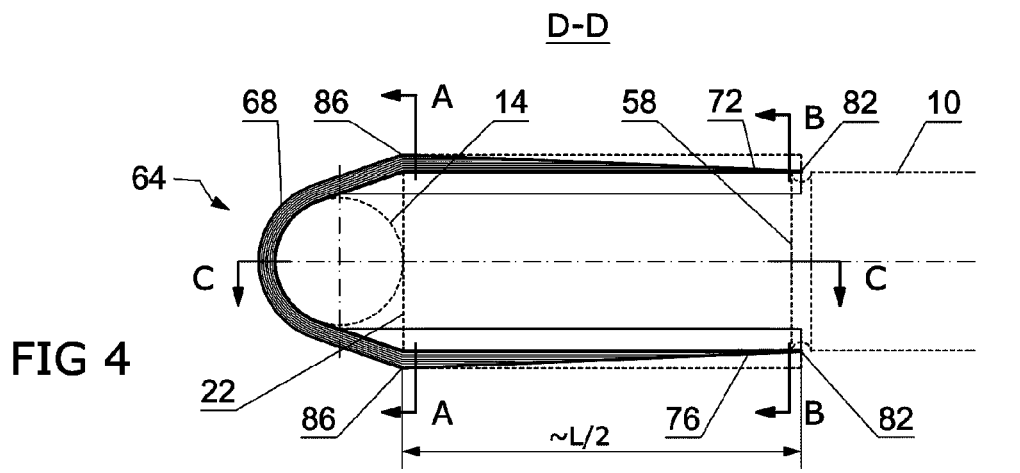
FIG. 4 is a cross-sectional view of a joining member.
Figures 5, 6:
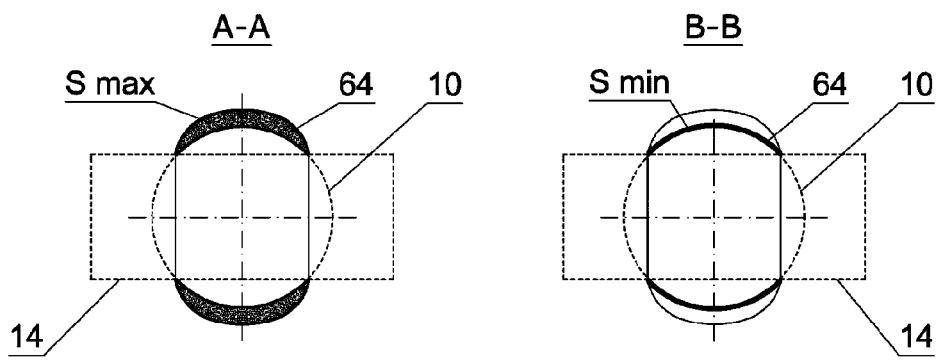
FIG. 5 is a cross-sectional view of the joining member.
FIG. 6 is another cross-sectional view of the joining member.
Figure 7:
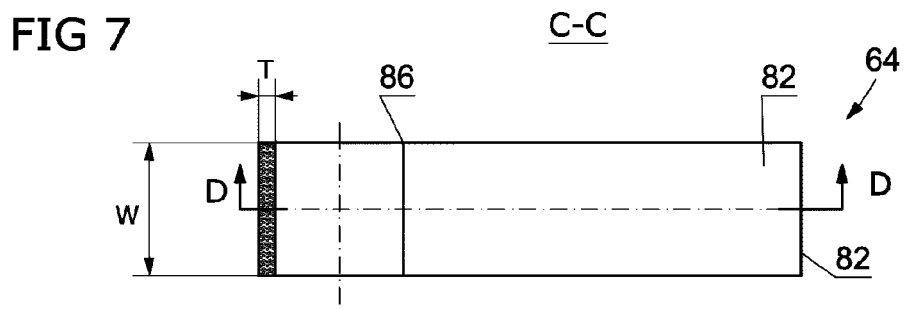
FIG. 7 is a top cross-sectional view of the joining member.

Referring now to FIG. 4, one of the two joining members 64 is shown; please note that during the process described above, two identical joining members 64 were made (assuming that the second mandrel 14 and third mandrel 18 were identical). The joining member 64 has a U-shape, with a bottom of the U 68, and a first leg of the U 72, and the second leg of the U 76. Each leg has a far end 82 and a beginning end 86. Shown in dashed lines are the first mandrel 10 and the second mandrel 14. They are shown in dashed lines, because in use, the mandrels 10, 14, 18 are removed from the joining members 64. It can be seen in this FIG. 4, that the first and second legs 72, 76 each has a taper that goes from generally its thickest point generally near the beginning end 86 down to its thinnest point generally at the far end 82. FIG. 5 shows a cross-sectional view of a joining member 64 from FIG. 4 at generally near the beginning end 86. FIG. 6 shows a cross-sectional view of a joining member 64 from FIG. 4 at generally near the far end 82. The cross-sectional area of the anisotropic material is given by S. S is at its greatest near the beginning end 86, and thus is designated $S_{max}$. S is at its smallest near the far end 82, and thus is designated $S_{min}$. FIG. 7 is a cross-sectional view of the joining member 64.

Figure 8:
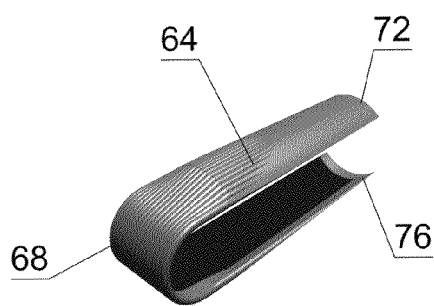
FIG. 8 is a perspective view of a joining member.
Figure 9:
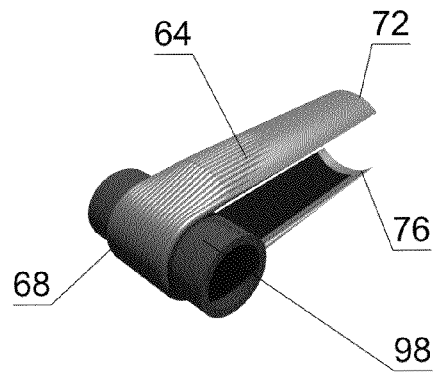
FIG. 9 is a perspective view of an anchor member inside a joining member.
Figure 10:
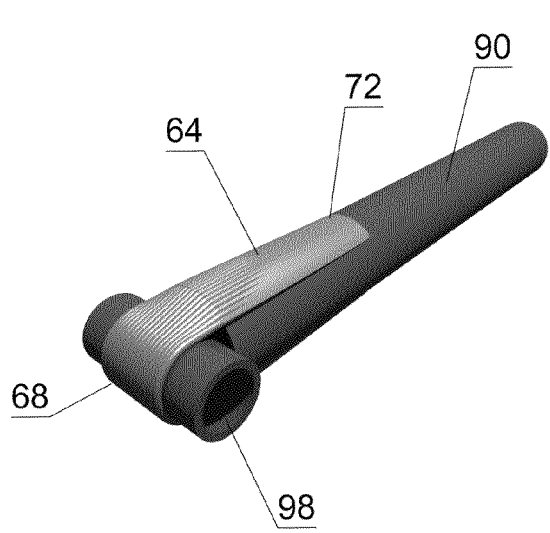
FIG. 10 is a perspective view of a first composite member inside a joining member.
Figure 11:
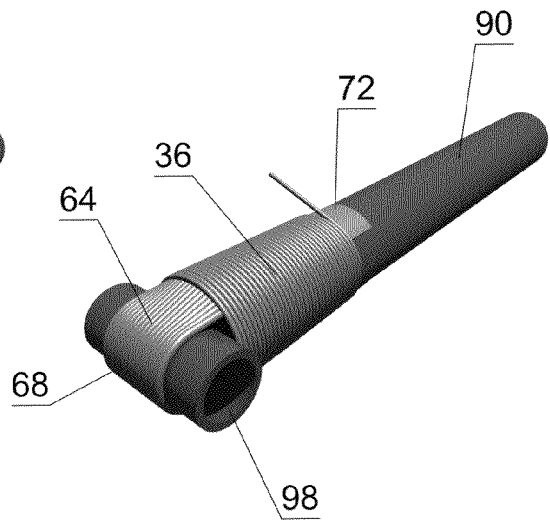
FIG. 11 is a perspective view of the joining member with wire wound about the joining member.
Figure 12:
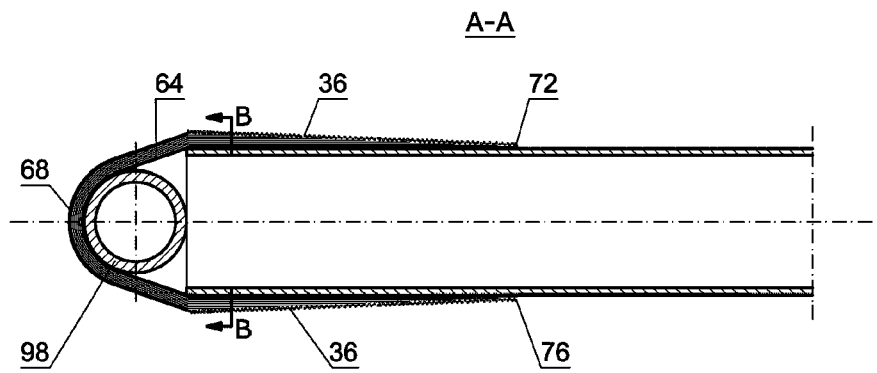
FIG. 12 is a cross-sectional view of an anchored composite member.
Figure 13:
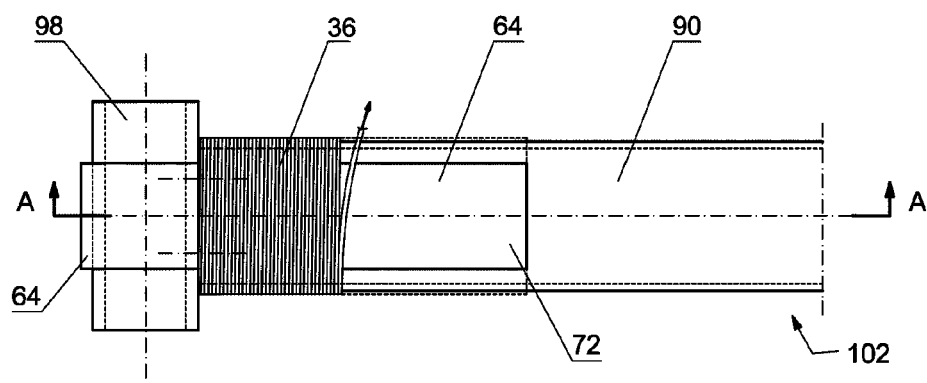
FIG. 13 is a top view of the anchored composite member.
Figure 14:
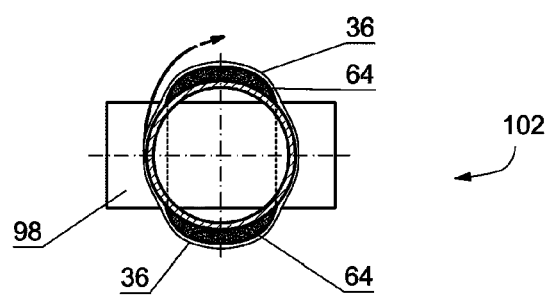
FIG. 14 is a front view of the anchored composite member.

FIGS. 8-11 show how one uses the joining member 64 to join a generally cylindrical composite member 90 to another generally cylindrical composite member 94 (shown in FIG. 12). The first step, is to take a joining member 64, as shown in FIG. 8. Next, attach a generally cylindrical anchor member 98 to the joining member 64 as shown in FIG. 9. Next, attach the generally cylindrical composite member 90 to the joining member 64 as shown in FIG. 10. The generally cylindrical composite member 90 and generally cylindrical anchor member 98 are joined to the joining member 64 via bonding technology. What is meant by bonding technology, or adhesive bonding, may be described in terms of secondary bonding. Secondary bonding is the joining, by means of adhesive, of two or more already cured composite parts. The bond strength of the bonding is the adhesion between bonded surfaces, as measured by load/bond area, the stress required to separate a layer of material from another material to which it is bonded. Next, a wire 36 made of anisotropic material 34 is wound onto the first and second legs 72, 76 of the joining member 64 as shown in FIG. 11, with the wire made of anisotropic material 34 being wound about the joining member 64 compressing the joining member 64 to the composite member 90. The wire may of course be any suitable elongated structure such as but not limited to a cable, or line. The wire of anisotropic material 36, may be the same type of wire 35 described earlier. The device shown in FIG. 11 shall be identified as an anchored composite member 102, to indicate that the composite member 90 is now attached to the anchor member 98 via the joining member 64 and wound wire 36. The winding of the wire 36 made of anisotropic material 34 onto the joining member 64 forms normal forces to act on the bonding surface between the composite member 90 and the legs 72, 76 of the joining member 64. This forms a strong bond between the cylindrical member 90 and the joining member 64. FIG. 12 is a cross-sectional view of the system shown in FIG. 11. FIG. 13 is a top view of the device shown in FIG. 12. FIG. 14 is another cross-sectional view of the device shown in FIG. 13.

Figure 20:
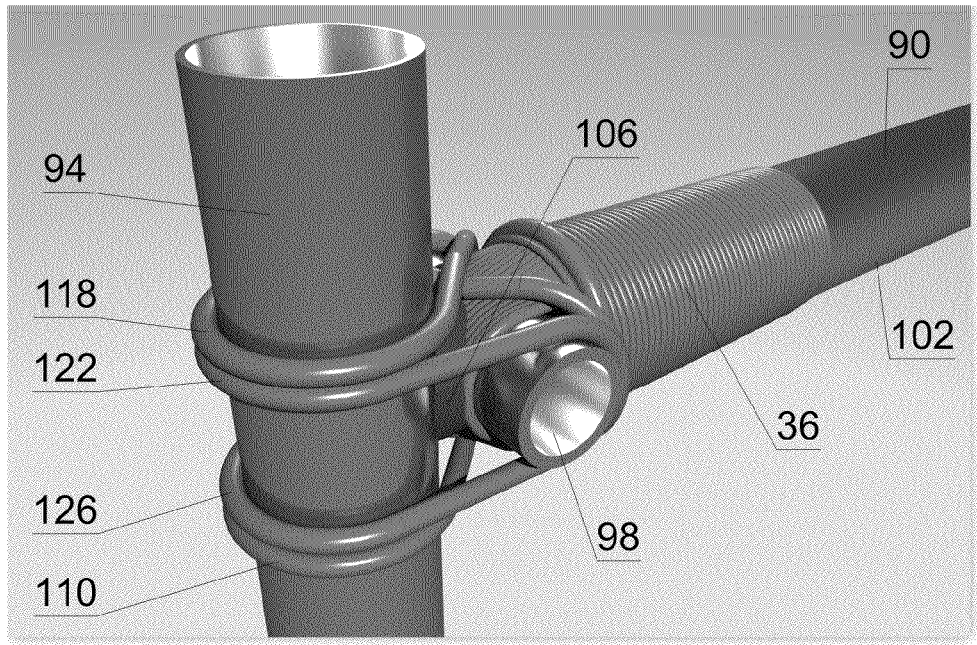
FIG. 20 is a close up perspective view of the device from FIG. 19.
Figure 21:
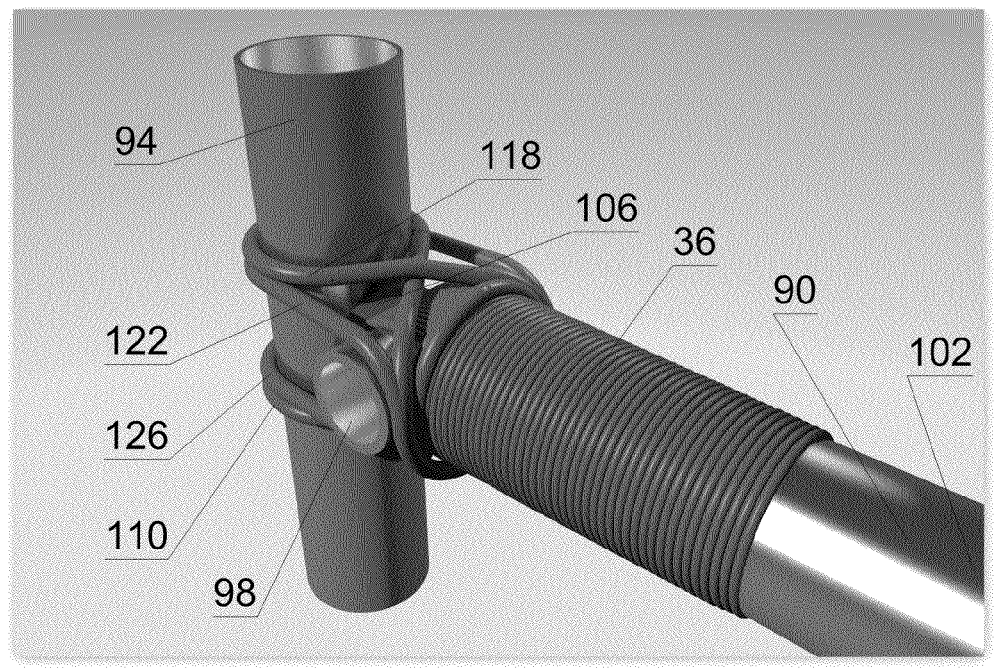
FIG. 21 is a close up perspective view of the device from FIG. 20, from another angle.

FIGS. 15 through 19 show how this system can be used to join a generally cylindrical composite member 90 to a second generally cylindrical composite member 94. The anchored composite member 102 may be positioned at any angle to the second composite member 94. In some embodiments, a filler material 106 may be positioned at the contact area between the anchored composite member 102 and the second composite member 94. The material 106 is for fill gap and transferring stress load between composite member 102 and second composite member 94. Filler material 106 may be a composite material, such as, but not limited to: milled fiber and a matrix. In this disclosed, the term filler means a solid constituent, usually inert, added to a matrix to modify a composite's properties (e.g., increase viscosity, improve appearance or de-crease density) or to decrease part material cost. In this disclosure, milled fiber means a continuous glass or carbon strands hammer-milled into very short fibers. In other embodiments, the anchored composite member 102 may directly abut to the second composite member 94. FIG. 16, shows how a first winding 110 made of a unidirectional composite material attaches the anchored composite member 102 to the second composite member 94. The first winding 110, as well as the second, third and fourth windings discussed below, may be a line, cord, wire, or cable made out of the unidirectional composite material. In this disclosure, the term "Unidirectional" (UD) means the orientation of fibers in one direction. In this disclosure, a "unidirectional composite" means a material such as but not limited to a wire of continuous fiber, included materials are: carbon, Kevlar, glass, etc orientated in one direction with a matrix, such as but not limited to epoxy, resin, etc. the FIG. 16 shows the first winding 110 forming a first loop around the first composite member 90 and anisotropic material 34, with a single twist 114, and a second loop around the second composite member 94. The first winding 110 is adjacent to the bottom surface of the anchor member 98. FIG. 17 shows a second winding 118 forming a first loop around the first composite member 90 and anisotropic material 34, with a single twist 114, and a second loop around the second composite member 94. The second winding 118 is adjacent to the top surface of the anchor member 98. FIG. 18 shows a third winding 122 looped around the first composite member 90 and anisotropic material 34 on the one hand, and around the second composite member 94 on the other hand, without a twist in the winding 122. The third winding 122 is adjacent to the top surface of the anchor member 98. FIG. 19 shows a fourth winding 126 looped around the first composite member 90 and anisotropic material 34 on the one hand, and around the second composite member 94 on the other hand, without a twist in the winding 122. The fourth winding 126 is adjacent to the bottom surface of the anchor member 98. FIGS. 20 and 21 show a close up view of the four windings attaching the anchored composite member 102 to the second composite member 94. Of course other variations of attaching the windings to the second composite member 98 and the anchored composite member 102 are encompassed by this disclosure. The first, second, third, and fourth windings 110, 118, 122, 126 are the result of a continuous winding process.

Figure 22:
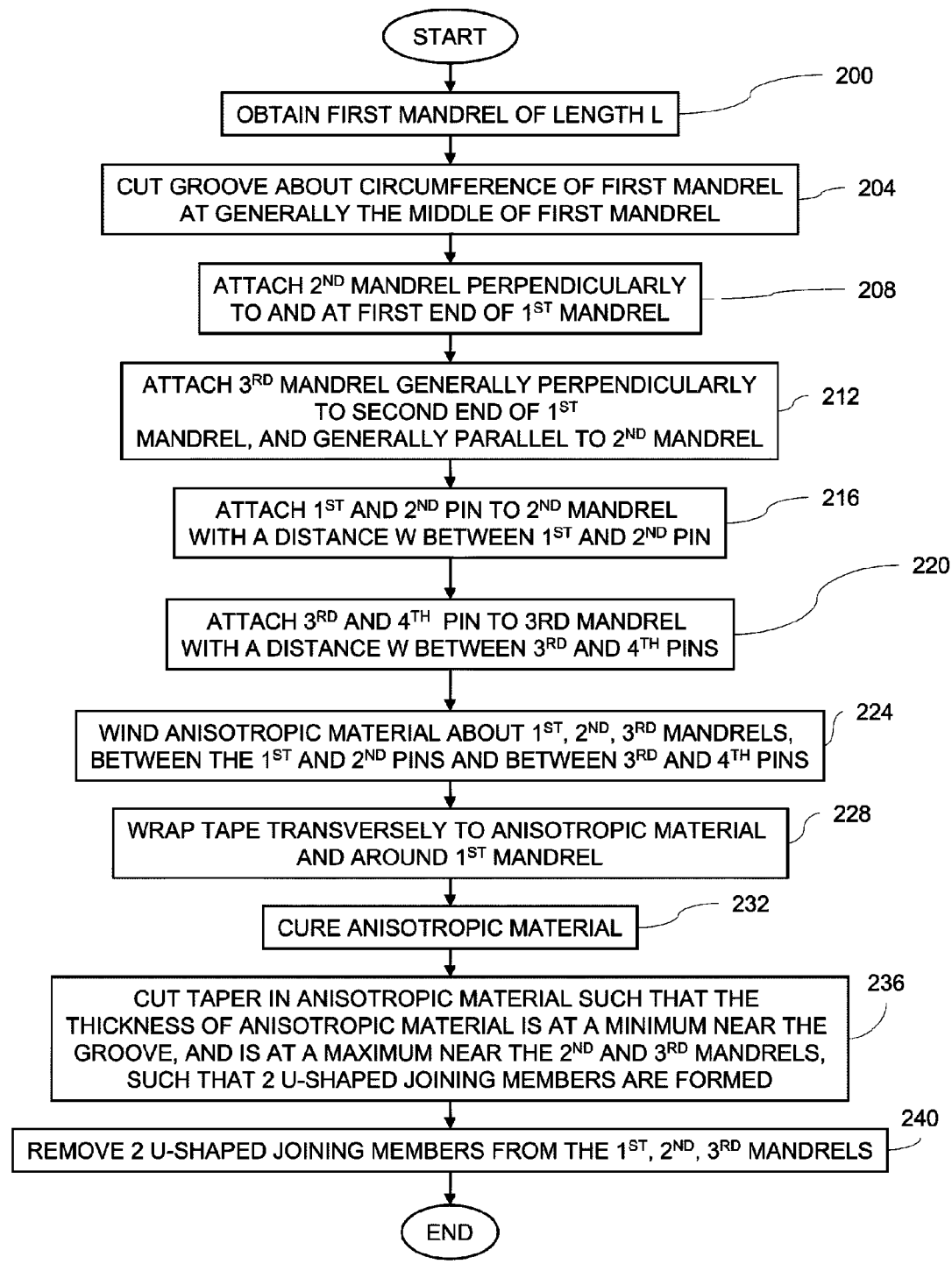
FIG. 22 is a flowchart illustrating how to make two joining members.

FIG. 22 shows a flowchart illustrating a method of making the joining system. At act 200, one obtains a first mandrel 10 of length L. At act 204, a groove (or undercut) 58 is cut about the circumference of the first mandrel 10, generally at the middle of the mandrel. At act 208, a second mandrel 14 is attached in a generally perpendicular orientation to the first end 22 of the first mandrel 10. At act 212, a third mandrel 18 is attached in a generally perpendicular orientation to the second end 26 of the first mandrel 10. At act 216, the first and second pins 38, 42 are attached to the second mandrel, with a distance W between the pins. At act 220 third and fourth pins 46, 50 are attached to the third mandrel with a distance W between the pins. At act 224, an anisotropic material 34 is wound about the first, second, and third mandrels 10, 14, 18, between the first and second pins 38, 42 and between the third and fourth pins 46, 50. At act 228 tape 54 is wrapped transversely to the anisotropic material 34 and around the first mandrel 10. At act 232, the anisotropic material is cured. At act 236, a taper is cut in the anisotropic material 34 such that the thickness of anisotropic material 34 is at a minimum near the groove 58, and is at a maximum near the second mandrel 14 and third mandrel 18, such that two u-shaped joining members 64 are formed. At act 240, the two u-shaped joining members 64 are removed from the first, second, and third mandrels 10, 14, 18.

Figure 23:
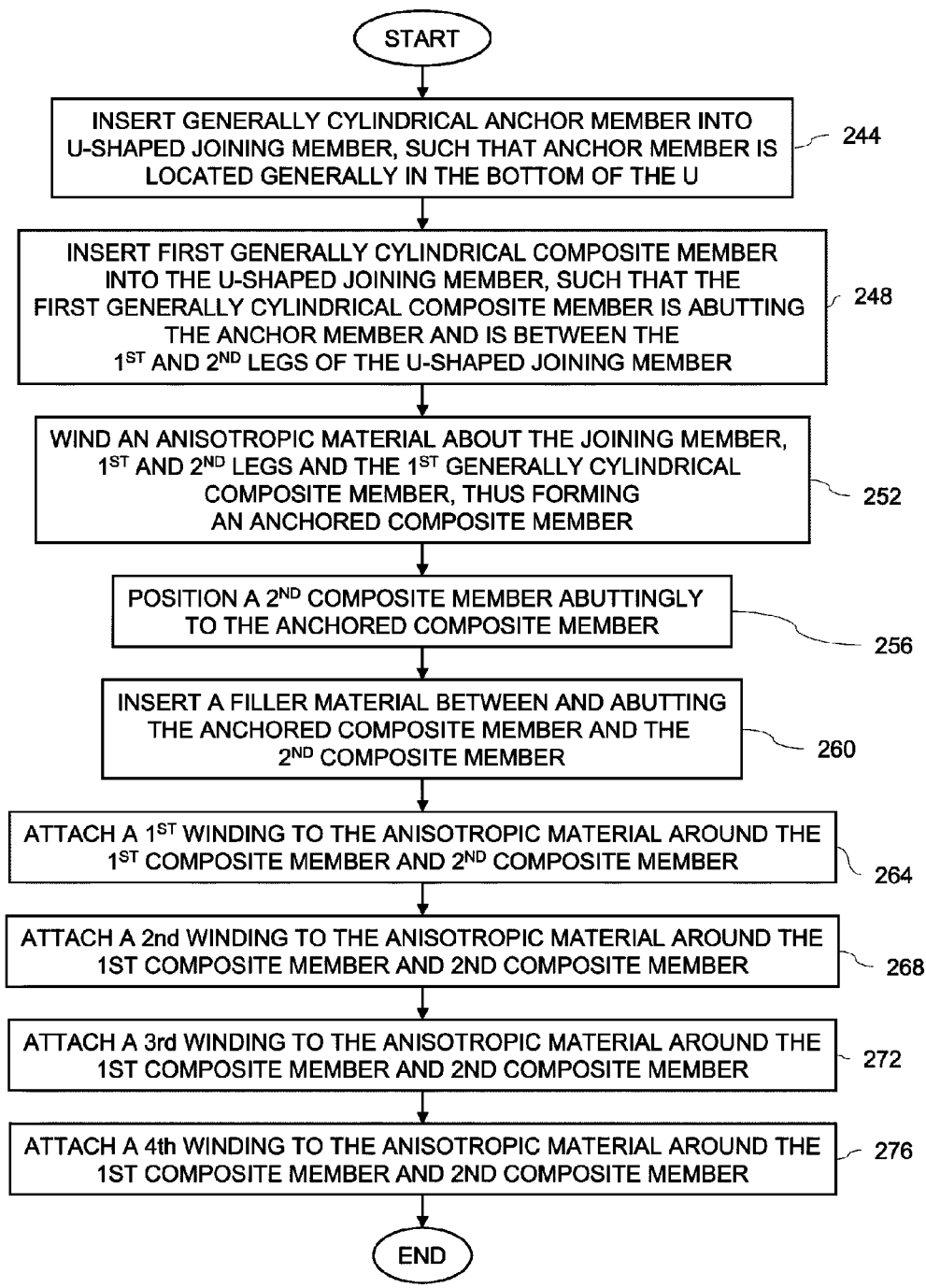
FIG. 23 is a flowchart illustrating how to join tubular members.

FIG. 23 shows a flowchart illustrating a method of using the disclosed joining system. At act 244, one inserts a generally cylindrical anchor member 98 into a U-shaped joining member 64, such that anchor member 98 is located generally in the bottom 68 of the U. At act 248, one inserts a first generally cylindrical composite member 90 into the u-shaped joining member 64, such that the first generally cylindrical composite member 90 is abutting the anchor member 98 and is between the first and second legs 72,76 of the u-shaped joining member. The u-shaped joining member 64, anchor member 98 and composite member 90 are joined by an adhesive. At act 252, one winds an anisotropic material 34 about the joining member 64, first and second legs 72, 76, and the first generally cylindrical composite member 90, thus forming an anchored composite member 102, At act 256, one positions a second composite member 94 adjacently to and at any angle the anchored composite member 102 as shown in FIG. 15. At act 260, a filler material 106 is inserted between and abutting the anchored composite member 102 and the second composite member 94. At act 264, a first winding 110 is attached to the anisotropic material 34 around the first composite member 90 and the second composite member 94, in the manner described in the above. At act 268, a second winding 118 is attached to the anisotropic material 34 around the first composite member 90 and the second composite member 94, in the manner described in the above. At act 272, a third winding 122 is attached to the anisotropic material 34 around the first composite member 90 and the second composite member 94, in the manner described in the above. At act 276 a fourth winding 126 is attached to the anisotropic material 34 around the first composite member 90 and the second composite member 94, in the manner described in the above. Of course other variations of attaching the windings to the second composite member 98 and the anchored composite member 102 are encompassed by this disclosure.

The disclosed invention has many advantages. Using the means and system described above, complex structures made with composite members (which may be cylindrical, or have other cross-sectional shapes such as elliptical, square, triangular, etc) may be built without the need to drill or weld the composite members, which drilling and/or welding can lead to the failure of the composite members.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A system for joining tubular members comprising:
    a U-shaped joining member, with a first leg, a bottom of the U in communication with the first leg, and a second leg in communication with the bottom of the U, and wherein the first leg and second legs have a taper such that the cross-sectional surface area of the first leg is at a minimum at generally the far end of the first and second legs, and the cross-sectional surface is at a maximum at generally the beginning end of the first and second legs;
    an anchor member configured to fit generally in the bottom of the U;
    a first tubular member configured to fit abutting the anchor member, and between the first and second legs;
    a wire made of anisotropic material configured to be wound about the first leg, second leg, and a portion of the first tubular member located between the first leg and second leg;
    a second tubular member configured to structurally attach to the first tubular member, U-shaped joining member, anchor member, and anisotropic material;
    a plurality of windings configured to attach the second tubular member to an anchored member.

2. The system of claim 1, wherein the first tubular member and the second tubular member are both made of composite materials.

3. The system of claim 1, wherein the windings are made of an anisotropic material.

4. The system of claim 1, wherein the U-shaped joining member is made from a winding of wire made from an anisotropic material.

\* \* \* \* \*